US006728624B2

(12) United States Patent
Palazzi et al.

(10) Patent No.: US 6,728,624 B2
(45) Date of Patent: Apr. 27, 2004

(54) METHOD FOR ESTIMATING THE FILLING OF A CYLINDER IN AN INTERNAL COMBUSTION ENGINE

(75) Inventors: Alessandro Palazzi, Bologna (IT); Jean Charles Minichetti, Nanterre (FR)

(73) Assignee: Magneti Marelli Powertrain S.p.A., Turin (IT)

( * ) Notice: Subject to any disclaimer, the term of this patent is extended or adjusted under 35 U.S.C. 154(b) by 150 days.

(21) Appl. No.: 10/073,257

(22) Filed: Feb. 13, 2002

(65) Prior Publication Data
US 2002/0148285 A1 Oct. 17, 2002

(30) Foreign Application Priority Data
Feb. 13, 2001 (IT) .................................. BO2001A000076

(51) Int. Cl.$^7$ .............................. F01L 1/34; G06F 19/00
(52) U.S. Cl. .................... 701/103; 701/110; 123/90.15; 73/117.3
(58) Field of Search ............................ 123/90.11, 90.15, 123/90.16, 90.17, 90.18, 316, 478, 480; 73/116, 117.3, 118.1, 118.2; 701/101, 102, 103, 110, 115

(56) References Cited

U.S. PATENT DOCUMENTS

| 4,633,403 A | * | 12/1986 | Asmus ..................... 123/90.16 |
| 5,211,146 A | * | 5/1993 | Pischinger .................. 123/316 |
| 5,520,153 A | | 5/1996 | Milunas |
| 5,690,065 A | * | 11/1997 | Janse van Vuuren .... 123/90.16 |
| 5,714,683 A | | 2/1998 | Maloney |
| 6,371,066 B1 | * | 4/2002 | Cullen ..................... 123/90.15 |

FOREIGN PATENT DOCUMENTS

| DE | 199 06 707 A1 | 8/2000 |
| WO | WO 01 42641 A1 | 6/2001 |

* cited by examiner

Primary Examiner—Willis R. Wolfe
(74) Attorney, Agent, or Firm—Venable LLP; Robert Kinberg; Catherine M. Voorhees

(57) ABSTRACT

Method for estimating the filling of a cylinder in an internal combustion engine provided with cam stroke variation system. A theoretical induction efficiency which the cylinder would have if it operated with an optimal induction/exhaust timing value is estimated; said theoretical induction efficiency is derated by a correction factor depending on the induction/exhaust timing value actually used to estimate the induction efficiency, which is a standardised measurement of the filling of the cylinder.

9 Claims, 2 Drawing Sheets

METHOD FOR ESTIMATING THE FILLING OF A CYLINDER IN AN INTERNAL COMBUSTION ENGINE

This application claims the priority of Italian Application No. BO2001A 000076 filed Feb. 13, 2001, the disclosure of which is being incorporated herein by reference.

BACKGROUND OF THE INVENTION

The present invention concerns a method for estimating the filling of a cylinder in an internal combustion engine.

This invention can be advantageously applied in internal combustion engines with variable cam stroke, to which the following description will explicitly refer without losing out in general terms.

The known internal combustion engines are provided with a control unit which, at every engine cycle, determines the adjustment values for optimising combustion in the individual cylinders in order to obtain maximum efficiency possible in all operating conditions. To determine these adjustment values (for example opening of the throttle valve, injection advance, injection duration), the control unit requires certain information concerning the current operating status of the engine; among this information, estimation of the filling of each cylinder is important, i.e. estimation of the mass of fresh air (combustion agent) sucked in by each cylinder during the induction phase.

Estimation of the filling of each cylinder is particularly complicated in internal combustion engines with variable cam stroke because modification of the induction and/or exhaust phase affects the cylinder filling capacity, thus modifying the "acoustic" characteristics of the induction and/or exhaust subsystems. In particular, the actual position of the stroke variator in induction/exhaust with respect to the rest position determines both the different induction capacity of the cylinders and the amount of exhaust gas trapped inside them.

To estimate the filling of each cylinder, an air flow rate meter is normally used, fitted upstream of the cylinder inlet valve; the use of air flow rate meters is expensive, however, due to the high cost of the devices themselves.

Another known solution for estimating the filling of each cylinder is to parameterise reconstruction of the cylinder load in two-dimensional planes according to assigned induction/exhaust timing values; by linear interpolation between two adjacent two-dimensional planes, the cylinder filling is determined for all permitted induction/exhaust timing values. Again, however, this solution is fairly expensive as it involves the use of a large-capacity and therefore costly memory in the control unit to store all the necessary two-dimensional planes; furthermore, said solution requires fairly lengthy engine test bench set-up times.

SUMMARY OF THE INVENTION

The aim of the present invention is to provide a method for estimating the filling of a cylinder in an internal combustion engine which has none of the disadvantages described and, in particular, is easy and inexpensive to implement.

According to one embodiment of the present invention, a method is provided for estimating the filling of the cylinder in an internal combustion engine that includes estimation of a theoretical induction efficiency which the cylinder would have if it operated with an optimum induction/exhaust timing value (VVT), i.e. with the induction/exhaust timing value (VVT) that permits maximisation of the mass ($m_a$) of a combustion agent that can be sucked in by the cylinder, determination of the value of a correction factor ($K_{vvt}$) according to the induction/exhaust timing value (VVT) actually used an estimation of induction efficiency, i.e. a standardized measurement of the filling of the cylinder, multiplying the theoretical induction efficiency by correction factor ($K_{vvt}$).

BRIEF DESCRIPTION OF THE DRAWINGS

The present invention will now be described with reference to the attached drawings, which illustrate a non-restrictive implementation example, in which.

DETAILED DESCRIPTION OF THE INVENTION

Figure 1:
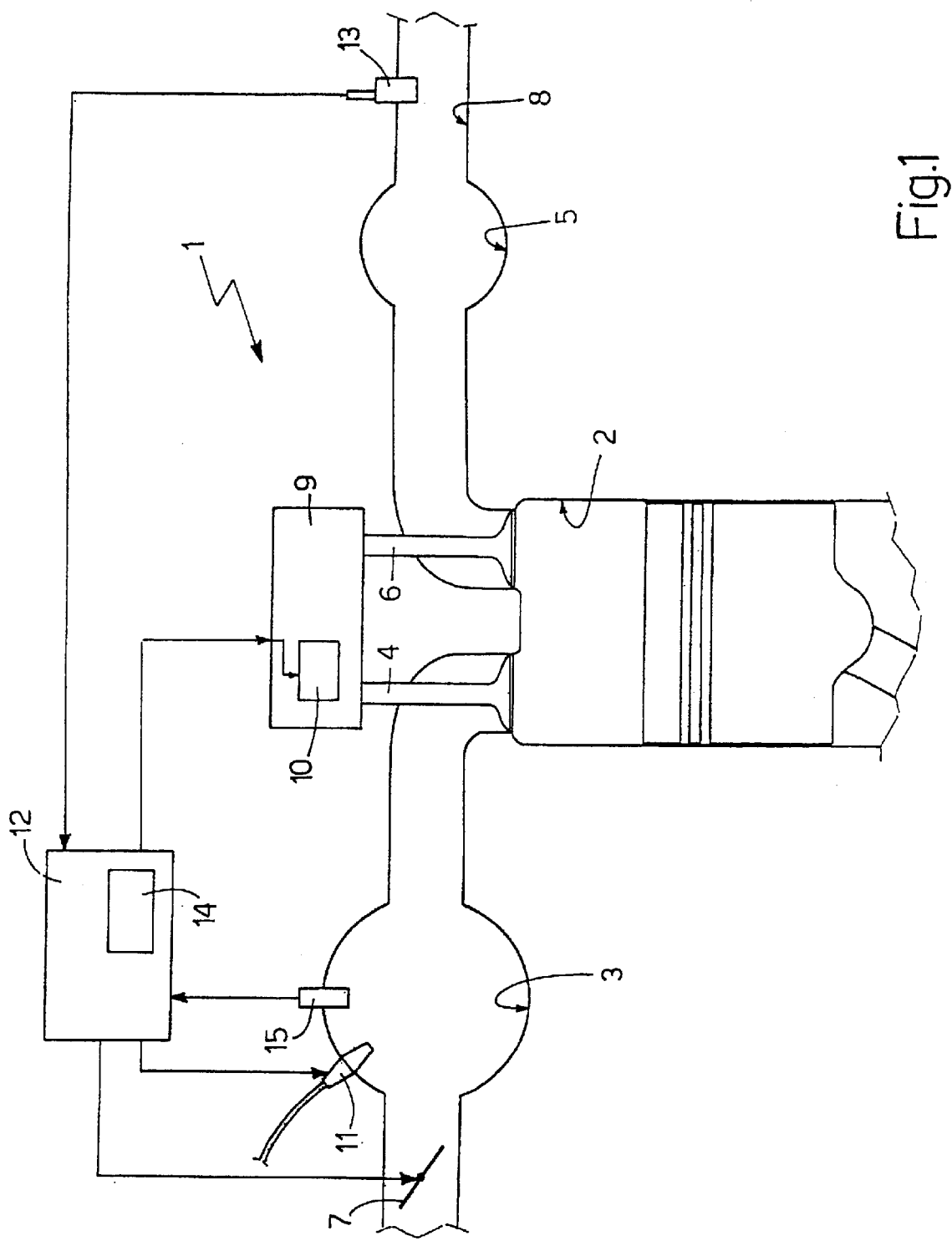
FIG. 1 is a schematic view of an internal combustion engine operating according to the method subject of the present invention.

In FIG. 1, ref. no. 1 indicates, overall, an internal combustion engine provided with four cylinders 2 (of which only one is illustrated in FIG. 1), each of which is connected to an inlet manifold 3 via at least one respective inlet valve 4 and to an exhaust manifold 5 via at least one respective exhaust valve 6. The inlet manifold 3 receives fresh air (i.e. air from the outside containing approximately 20% oxygen) via a throttle valve 7 that can be adjusted from a closed to a maximum opening position. The exhaust manifold 5 leads to an exhaust pipe 8 which terminates in a silencer (known and not illustrated) for emission into the atmosphere of the gases produced by combustion.

The inlet valve 4 and the exhaust valve 6 are controlled by a cam control device 9, which is of known type and provided with mechanical cam stroke variation system 10. The fuel (for example petrol, diesel, methane, LPG . . . ) is injected into the inlet manifold 3 by an injector 11 of substantially known type; according to a different embodiment not illustrated, the fuel is injected directly into each cylinder 2 by means of a respective injector.

The engine 1 furthermore comprises a control unit 12 which, in particular, controls at each cycle the throttle valve 7 and the injector 11 for filling the cylinders 2 with a mixture of combustion agent (fresh air) and fuel in a proportion determined according to the operating conditions of the engine 1 and according to the commands received from the driver. The control unit 12 is connected to a lambda probe 13 which is fitted in the exhaust pipe 8 and is designed to determine in a known way the amount of oxygen present in the gases contained in said exhaust pipe 8.

The control unit 12 is provided with an estimation device 14 which is designed to provide said control unit 12 with an estimation, moment by moment, of the mass $m_a$ of fresh air (i.e. combustion agent) sucked in by each cylinder 2 during induction and, therefore, the respective induction efficiency $\eta_{asp}$ defined by the ratio (summarised in equation [1]) between the mass $m_a$ of fresh air sucked in by the cylinder 2 and the mass $m_{apot}$ of fresh air that can be potentially sucked in by the cylinder 2 in the ambient reference conditions, i.e. atmospheric pressure 101300 Pa and temperature 298° K. In other words, the induction efficiency $\eta_{asp}$ is a standardised measurement of the mass ma of fresh air sucked in by each cylinder 2 in the induction phase with respect to the mass $m_{apot}$ of fresh air that can be potentially sucked in by the cylinder 2 in the ambient reference conditions.

$$\eta_{asp}=m_a/m_{apot} \qquad [1]$$

The control unit 12 is connected to a sensor 15 of known type which is fitted inside the inlet manifold 3 and is designed to measure the pressure $p_a$ and temperature $t_a$ of the gas in the inlet manifold 3. The control unit 12 is furthermore connected to sensors (not illustrated) of known type, which are designed to measure the temperature $t_{H2O}$ of the cooling liquid of the engine 1, the atmospheric pressure $p_{atm}$ and the rotation speed n of the engine 1.

As is known, the presence of the cam stroke variation system 10 affects to a fairly considerable extent the mass $m_a$ of fresh air (i.e. combustion agent) sucked in by each cylinder 2, as the variation of the moment when the inlet and exhaust valves 4 and 6 begin to open modifies both the induction capacity of cylinder 2 and the amount of residual burnt gas inside said cylinder 2. In particular, during the induction phase, the dynamic effects of the filling of each cylinder 2 can be classified into two types: the dynamic effects due to the fluid dynamic pressure losses present on the different components making up the induction circuit, and the dynamic effects depending on the acoustics of the induction circuit.

The dynamic effects depending on the acoustics of the induction circuit consist mainly of:

"RAM" effect: the pressure $p_a$ in the inlet manifold 3 during each induction cycle depends mainly on the speed of the pistons and the valve lift law which determines the changes in the passageway sections of the inlet valves 4. The mass of air induced in each cylinder 2, and therefore the volumetric efficiency of the engine 1, depends on the pressure value near the inlet valve 4 of each cylinder 2 just before it opens. At certain speeds, the inertia of the gas in the inlet manifold 3 increases the pressure near the inlet valves 4 also during inversion of the piston movement (beginning of compression phase), allowing the filling process of cylinder 2 to continue. To exploit this phenomenon, closure of the inlet valves 4 is deliberately delayed after the BDC (bottom dead centre) of the respective pistons.

"Backflow" effect: due to delay in closing of the inlet valves 4, a fraction of the fresh load sucked in by the respective cylinders 2 returns to the inlet manifold 3.

"Tuning" effect: during the exhaust phase each cylinder 2 induces throbbing in the flow of exhaust gases which in their turn generate pressure waves that spread in the exhaust system (exhaust manifold 5 and exhaust pipe 8); according to the tuning of said exhaust system, the pressure waves generated can enhance or inhibit the action of evacuation of the burnt gases, reducing or increasing the pressure in the exhaust manifold 5 near the exhaust valve 6 at the moment when it opens.

The above-mentioned "backflow" and "tuning" dynamic effects are particularly sensitive to the opening/closing moments of the induction and exhaust valves 4 and 6; the cam stroke variation system 10 is used to optimise said dynamic effects according to the operating point of the engine 1 so as to maximise the overall efficiency of said engine 1.

Furthermore, it is known that for each engine speed n, there is an optimal induction/exhaust timing value VVT which maximises the mass ma of fresh air (i.e. combustion agent) that can be sucked in by each cylinder 2; any other induction/exhaust timing value VVT used determines a reduction in the mass $m_a$ of fresh air sucked in by each cylinder 2.

Figure 2:
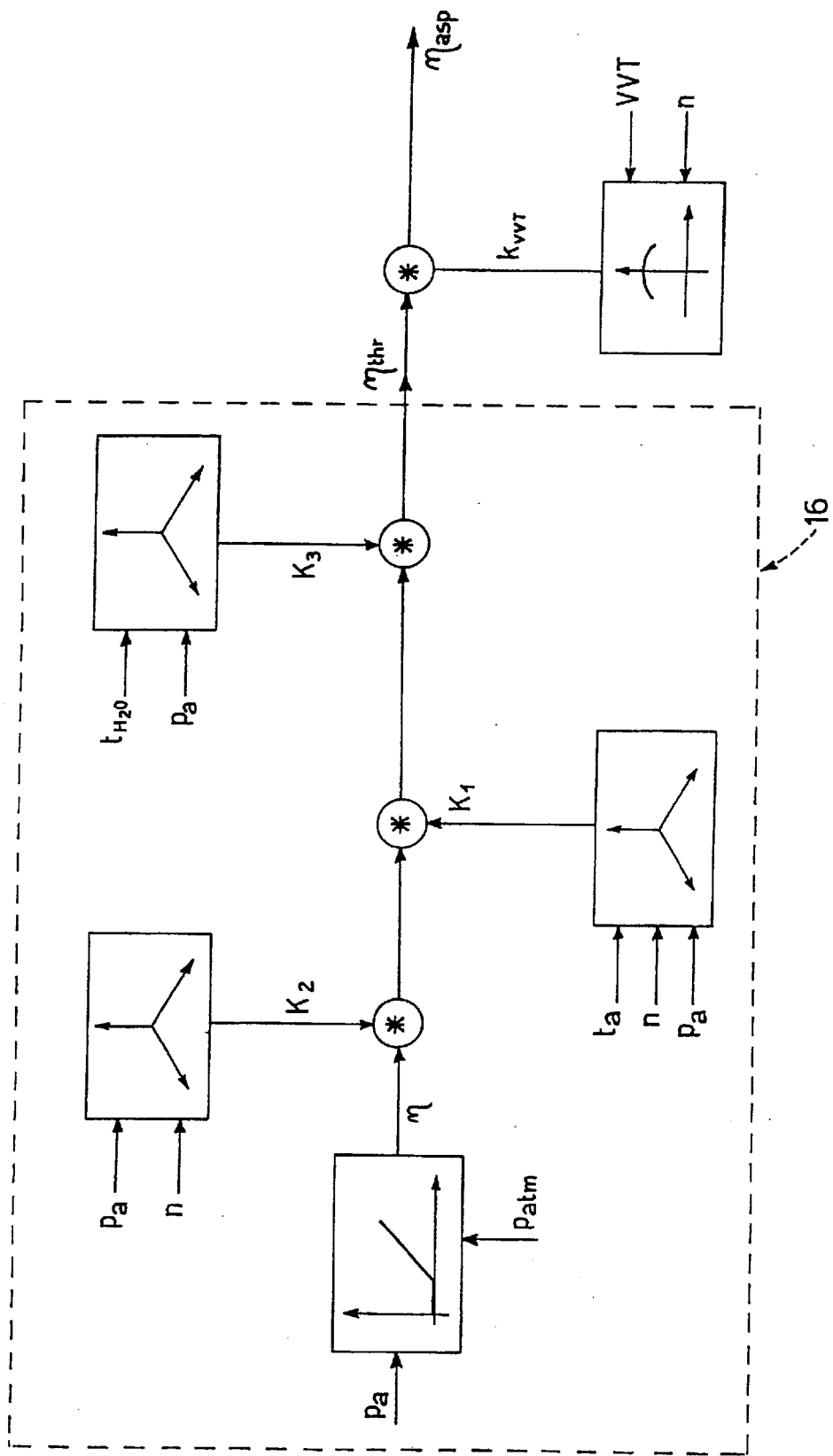
FIG. 2 is a block diagram of a control unit of FIG. 1.

According to the block diagram of FIG. 2, to estimate the induction efficiency $\eta_{asp}$, the estimation device 14 estimates a theoretical induction efficiency $\eta_{thr}$ which each cylinder 2 would have if it operated with the optimal induction/exhaust timing value VVT, i.e. with the induction/exhaust timing value VVT that permits maximisation of the mass $m_a$ of fresh air (i.e. combustion agent) that can be sucked in by said cylinder 2.

Subsequently, to calculate the induction efficiency $\eta_{asp}$, the estimation device 14 derates the theoretical induction efficiency $\eta_{thr}$ by multiplying it by a correction factor $K_{VVT}$ which is between 0 and 1 (in real applications it is between 0.6 and 1) and dependent on the induction/exhaust timing value VVT actually used by the engine 1.

Via bench tests on different engines and different types of timing devices, it was observed that, barring negligible differences, the correction factor $K_{VVT}$ is linked to the timing value VVT by a quadratic relation summarised by equation [2]:

$$K_{VVT}=A(n)*(VVT-VVTopt(n))^2+B(n)*(VVT-VVTopt(n))+1 \qquad [2]$$

in which:

A and B are parameters depending on the speed n of the engine 1; and

VVTopt is the value of the timing corresponding to maximum filling of the cylinder and depends on the speed n of the engine 1.

From equation [2] it appears clear that on the Cartesian plane VVT, $K_{VVT}$ the relation between the correction factor $K_{VVT}$ and the timing value VVT is represented by a series of parabolas, each of which is distinguished by a set speed value n of the engine 1.

It is evident that for each type of engine 1 the effective values of the coefficients A, B and C of the equation [2] must be determined by a series of engine bench tests.

To estimate the theoretical efficiency $\eta_{thr}$, the estimation device 14 uses an estimation component 16 which is substantially able to estimate the induction efficiency in an internal combustion engine with constant timing (i.e. without the cam stroke variation system 10) according to the pressure $p_a$ and temperature $t_a$ of the gas in the inlet manifold 3, the temperature $t_{H2O}$ of the cooling liquid of the engine 1, the atmospheric pressure $p_{atm}$ and the rotation speed n of the engine 1. In other words, to estimate the theoretical efficiency $\eta_{thr}$ it is assumed that the engine 1 has constant timing, i.e. it is without the cam stroke variation system 10, and operates with an optimal VVT value.

In particular, the estimation component 16 calculates the theoretical efficiency $\eta_{thr}$ by means of the equation [3]:

$$\eta_{thr}=\eta(p_a,p_{atm})*k_1(p_a,n,t_a)*k_2(p_a,n)*k_3(p_a,t_{H2O}) \qquad [3]$$

in which:

$\eta(p_a, p_{atm})$ is a linear function that provides an initial estimate of the theoretical induction efficiency $\eta_{thr}$ according to the pressure $p_a$ of the gas in the inlet manifold 3 and with a deviation determined by the atmospheric pressure $p_{atm}$;

$K_1(p_a, n, t_a)$ is a function that provides a correction factor and uses the equation of the perfect gases to determine the density of the gas trapped in the cylinder 2 assuming that the cylinder 2 is an isolated system;

$k_2(p_a, n)$ is a function that provides a correction factor taking account of the effects of the cross-operation between valves 4 and 6 and the acoustics of the inlet manifold 3; and $k_3(p_a, t_{H2O})$ is a function that provides a correction factor taking account of the effects due to the thermal exchange between gas and lining of the cylinder 2.

From theoretical studies and numerous tests carried out on the engine test bench, it was observed that the above-described functions η, $k_1$, $k_2$ and $k_3$ can be easily obtained from the results of test measurements and are simple and easy to implement in memory units (known and not illustrated) of the estimation device 16.

For greater clarity, the theoretical analysis leading to definition of the equation [3] is detailed below.

The induction efficiency $\eta_{thr}$ is defined by the ratio between the mass $m_a$ of fresh air (i.e. combustion agent) sucked in by a cylinder 2 and the mass $m_{apot}$ of fresh air that can be potentially sucked in by cylinder 2 in the ambient reference conditions, i.e. atmospheric pressure 101300 Pa and temperature 298° K.

To estimate the mass $m_a$ of fresh air sucked in by a cylinder 2, it is assumed that the induction cycle of cylinder 2 is an ideal cycle, that the gaseous fluid sucked in is a perfect gas, that the temperature of the gaseous fluid sucked in is constant during the entire induction cycle and that the cylinder 2 is an isolated system. Under the above assumptions, the mass $m_a$ of fresh air sucked in by a cylinder is given by the difference between the mass $m_{asp}$ of gas present in the cylinder 2 at the end of the induction phase and the mass $m_{scar}$ of gas present in the cylinder 2 at the beginning of the induction phase, i.e. at the end of the exhaust phase.

$$m_{scar} = V_o{}^* \rho_{scar} \quad [4]$$

$$\rho_{scar} = p_{scar}/(R^* t) \quad [5]$$

$$m_{ssp} = (V_o + V_d)^* \rho_{ssp} \quad [6]$$

$$\rho_{scar} = p_{scar}/(R^* t) \quad [7]$$

$$rc = (V_o + V_d)/V_o \quad [8]$$

in which:
$V_o$ is the volume of the cylinder 2 at the end of the exhaust phase;
$V_d$ is the volume resulting from the stroke of the piston at the end of the induction phase;
rc is the compression ratio;
$\rho_{scar}$ is the density of the gas trapped in the cylinder 2 at the end of the exhaust phase, which can be estimated by applying the equation of the perfect gases, assuming that the cylinder 2 is an isolated system;
$\rho_{asp}$ is the density of the gas trapped in the cylinder 2 at the end of the induction phase, which can be estimated by applying the equation of the perfect gases, assuming that the cylinder 2 is an isolated system;
$p_{scar}$ is the pressure of the gas trapped in the cylinder 2 at the end of the exhaust phase;
$p_{ssp}$ is the pressure of the gas trapped in the cylinder 2 at the end of the induction phase;
t is the temperature of the gas trapped in the cylinder 2 assumed to be constant during the induction phase; and
R is the constant of the perfect gases.

From equations [4]–[8] it is simple to obtain the equation [9], which provides an estimate of the mass $m_a$ of gas sucked in by the cylinder 2;

$$m_a = m_{asp} - m_{scar} = \frac{V_0 \cdot rc}{R \cdot t}\left(p_{asp} - \frac{p_{scar}}{rc}\right) \quad [9]$$

Considering an engine operating point, this is characterised by given final pressure values for the induction and exhaust phase; for this engine operating point the density of the gas depends largely on its temperature. By linearising up to the first order the generic density of a gas taken from the relation of the perfect gases with respect to the reference temperature $T_o$, equation [10] is obtained:

$$\rho = \frac{p}{R \cdot T_0} - \frac{p}{R}\left(\frac{1}{t^2}\right)_{T=T_0}(t - T_0) \quad [10]$$

By inserting the equation [10] in the equation [9] we obtain equation [11] which provides the theoretical mass of gas trapped in the cylinder at the end of the induction phase:

$$m_a = \frac{V_0 \cdot rc}{R \cdot T_0}\left[1 - \frac{1}{T_0}(t_{asp} - T_0)\right]\left[p_{asp} - \frac{p_{scar}}{rc}\left(\frac{-t_{scar} + 2T_0}{-t_{asp} + 2T_0}\right)\right] \quad [11]$$

In the reference conditions $t = T_o$ and $p = p_{oatm}$ the induction efficiency $\eta_{thr}$ is provided by the equation [12]:

$$\eta_{thr} = \frac{m_a}{m_{apot}} = \frac{1}{p_{atm}}\left[1 - \frac{1}{T_0}(t_{asp} - T_0)\right]\left[p_{asp} - \frac{P_{scar}}{rc}\left(\frac{-t_{scar} + 2T_0}{-t_{asp} + 2T_0}\right)\right] \quad [12]$$

Considering a real cycle, the following observations should be made:
 between one phase and the next, the gas undergoes a molecular transformation, therefore the constant of the gases in the relation of the perfect gases is not the same for the two stationary cases; in fact the molecular weight of the two gases is very similar in the case of stoichiometric combustion and said difference is negligible;
 at the end of the induction and exhaust phases, the cylinder 2 cannot be considered a closed system also due to the effect of the valve cross-operation;
 the fluid dynamics of the gas in movement both in the inlet manifold 3 and in the exhaust manifold 5 affect the filling capacity of the cylinder 2; said fluid dynamics depend on the engine operating point;
 the temperature of the exhaust gas depends on the thermal exchange with the lining of cylinder 2, the number of engine revolutions n and the spark advance; and
 the exhaust pressure depends on the number of engine revolutions n.

Limiting the analysis to the above points, the following assumptions are made:
 the temperature of the gas sucked in depends mainly on the temperature $t_a$ of the gas in the inlet manifold and also on the engine revolution values and n–$p_a$ manifold pressure values;
 the thermal exchange between exhaust gas and lining of the cylinder 2 depends on the temperature $t_{H2O}$ of the water (this information roughly summarises the thermal state of the engine 1) and also depends on the engine revolution values and n–$p_a$ manifold pressure values;
 the fluid dynamics of the inlet/exhaust pipe can be incorporated in a sort of filling efficiency according to the engine revolution values and n–$p_a$ manifold pressure values;
 the pressure at the end of the induction phase is similar to the pressure $p_a$ of the inlet manifold;
 the exhaust pressure $p_{scar}$ is similar to the atmospheric pressure $p_{atm}$; and the deviation between exhaust pressure $p_{scar}$ and atmospheric pressure $p_{atm}$ is incorporated in the thermal exchange expression.

According to the above assumptions, the actual induction efficiency can be expressed with the equation [13], from which equation [3] derives directly:

$$\eta_{thr} = \eta(p_a, p_{atm}) \cdot \left[ p_a - \frac{1}{rc} F\left(\frac{t_{H2O}}{T_a}\right) \right] \cdot k_2(p_a, n) \cdot [1 - k_{asp}(t_a - T_0)] \quad [13]$$

The method described above for estimating the filling of each cylinder 2, i.e. for estimating the induction efficiency $\eta_{asp}$, offers undoubted advantages as it permits limitation of costs and considerable reduction of set-up times at the engine test bench. In particular, limitation of costs is obtained by using only the measurements of the sensors already present in engine 1, and requiring limited use of the memories of the control unit 12.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for estimating the filling of a cylinder in an internal combustion engine with constant timing; the method provides for estimation of an induction efficiency ($\eta_{thr}$), i.e. a standardised measurement of the filling of the cylinder, according to the pressure ($p_a$) and temperature ($t_a$) of the gas in the inlet manifold, the temperature ($t_{H2O}$) of the cooling liquid of the engine, the atmospheric pressure ($P_{atm}$) and the rotation speed (n) of the engine, wherein said induction efficiency ($\eta_{thr}$) is determined by applying the following equation:

$$\eta_{thr} = \eta(p_a, p_{atm}) * k_1(p_a, n, t_a) * k_2(p_a, n) * k_3(p_a, t_{H2O})$$

in which:

$\eta_{thr}$ is the induction efficiency;

$\eta(p_a, p_{atm})$ is a linear function that provides an initial estimate of the theoretical induction efficiency ($\eta_{thr}$) according to the pressure ($p_a$) of the gas in the inlet manifold and with a deviation determined by the atmospheric pressure ($p_{atm}$);

$k_1(p_a, n, t_a)$ is a function that provides a correction factor and uses the equation of the perfect gases to determine the density of the gas trapped in the cylinder;

$k_2(p_a, n)$ is a function that provides a correction factor that takes account of the effects of the cross-operation between the values and and of the acoustics of the inlet manifold; and $k_3(p_a, t_{H2O})$ is a function that provides a correction factor that takes account of the effects due to thermal exchange between gas and cylinder lining.

2. A method for estimating the filling of a cylinder in an internal combustion engine provided with a cam stroke variation system; the method provides for estimation of a theoretical induction efficiency ($\eta_{thr}$) which the cylinder would have if it operated with an optimum induction/exhaust timing value (VVT), i.e. with the induction/exhaust timing value (VVT) that permits maximisation of the mass ($m_a$) of combustion agent that can be sucked in by the cylinder, determination of the value of a correction factor ($K_{VVT}$) according to the induction/exhaust timing value (VVT) actually used and estimation of induction efficiency ($\eta_{asp}$), i.e. a standardised measurement of the filling of the cylinder, multiplying said theoretical induction efficiency ($\eta_{thr}$) by said correction factor ($K_{VVT}$) wherein said theoretical induction efficiency ($\eta_{thr}$) is determined by assuming that the engine is in constant timing, i.e. that it is not provided with the cam stroke variation system, said theoretical induction efficiency ($\eta_{thr}$) is determined according to the pressure ($p_a$) and temperature ($t_a$) of the gas in an inlet manifold, the temperature ($t_{H2O}$) of the cooling liquid of the engine, the atmospheric pressure ($p_{atm}$) and the rotation speed (n) of the engine, and said theoretical induction efficiency ($\eta_{thr}$) is determined by applying the following equation:

$$\eta_{thr} = \eta(p_a, p_{atm}) * k_1(p_a, n, t_a) * k_2(p_a, n) * k_3(p_a, t_{H2O})$$

in which:

$\eta_{thr}$ is the theoretical induction efficiency;

$\eta(p_a, p_{atm})$ is a linear function that provides an initial estimate of the theoretical induction efficiency ($\eta_{thr}$) depending on the pressure ($p_a$) of the gas in the inlet manifold and with a deviation determined by the atmospheric pressure ($p_{atm}$);

$k_1(p_a, n, t_a)$ is a function that provides a correction factor and uses the equation of the perfect gases to determine the density of the gas trapped in the cylinder;

$k_2(p_a, n)$ is a function that provides a correction factor that takes account of the effects of the cross-operation between values of the cylinder and the acoustics of the inlet manifold; and $k_3(p_a, t_{H2O})$ is a function that provides a correction factor that takes account of the effects due to thermal exchange between gas and cylinder lining.

3. A method for estimating the filling of a cylinder in an internal combustion engine provided with a cam stroke variation system; the method provides for estimation of an optimum induction/exhaust timing value (VVT), i.e. of the induction/exhaust timing value (VVT) that permits maximisation of the mass ($m_a$) of combustion agent that can be sucked by the cylinder, estimation of a theoretical induction efficiency ($\eta_{thr}$) which the cylinder would have if it operated with the optimum induction/exhaust timing value (VVT), determination of the value of a correction factor ($K_{VVT}$) according to the induction/exhaust timing value (VVT) actually used and estimation of induction efficiency ($\eta_{asp}$), i.e. a standardised measurement of the filling of the cylinder, multiplying said theoretical induction efficiency ($\eta_{thr}$) by said correction factor ($K_{VVT}$).

4. The method according to claim 3, wherein said induction efficiency ($\eta_{asp}$) is given by the ratio between the mass ($m_a$) of combustion agent sucked in by the cylinder and the mass ($m_{apot}$) of combustion agent that can be potentially sucked in by the cylinder in ambient reference conditions.

5. The method according to claim 3, wherein said correction factor ($K_{VVT}$) is determined according to the induction/exhaust timing value (VVT) actually used and according to the speed (n) of the engine.

6. The method according to claim 5, wherein said correction factor ($K_{VVT}$) is determined by applying the following equation:

$$K_{VVT} = A(n) * (VVT - VVTopt(n))^2 + B(n) * (VVT - VVTopt(n)) + 1$$

in which:

$K_{VVT}$ is the correction factor;

VVT is the induction/exhaust timing value actually used;

A and B are parameters depending on the speed n of the engine; and

VVTopt is the timing value corresponding to the maximum cylinder filling and depends on the speed n of the engine.

7. The method according to claim 3, wherein said theoretical induction efficiency ($\eta_{thr}$) is determined by assuming that the engine is in constant timing, i.e. that it is not provided with the cam stroke variation system.

8. The method according to claim 7, wherein said theoretical induction efficiency ($\eta_{thr}$) is determined according to the pressure ($p_a$) and temperature ($t_a$) of the gas in the inlet manifold, the temperature ($t_{H2O}$) of the cooling liquid of the engine, the atmospheric pressure ($p_{atm}$) and the rotation speed (n) of the engine.

9. A method according to claim 8, wherein said theoretical induction efficiency ($\eta_{thr}$) is determined by applying the following equation:

$$\eta_{thr}=\eta(p_a,p_{atm})*k_1(p_a,n,t_a)*k_2(p_a,n)*k_3(p_a,t_{H2O})$$

in which:

$\eta_{thr}$ is the theoretical induction efficiency;

$\eta(p_a,p_{atm})$ is a linear function that provides an initial estimate of the theoretical induction efficiency ($\eta_{thr}$) depending on the pressure ($p_a$) of the gas in the inlet manifold and with a deviation determined by the atmospheric pressure ($p_{atm}$);

$k_1(p_a,n,t_a)$ is a function that provides a correction factor and uses the equation of the perfect gases to determine the density of the gas trapped in the cylinder;

$k_2(p_a,n)$ is a function that provides a correction factor that takes account of the effects of the cross-operation between the values of the cylinder and and the acoustics of the inlet manifold; and $k_3(p_a,t_{H2O})$ is a function that provides a correction factor that takes account of the effects due to thermal exchange between gas and cylinder lining.

* * * * *